(12) United States Patent
Hooker

(10) Patent No.: US 10,882,415 B2
(45) Date of Patent: Jan. 5, 2021

(54) SYSTEM AND METHOD OF PRE-CHARGE TESTING TO PREVENT MISUSE OF ELECTRIC VEHICLE CHARGING STATION

(71) Applicant: General Electric Company, Schenectady, NY (US)

(72) Inventor: John Kenneth Hooker, Louisville, KY (US)

(73) Assignee: General Electric Company, Schenectady, NY (US)

( * ) Notice: Subject to any disclaimer, the term of this patent is extended or adjusted under 35 U.S.C. 154(b) by 450 days.

(21) Appl. No.: 15/830,322

(22) Filed: Dec. 4, 2017

(65) Prior Publication Data
US 2019/0168619 A1 Jun. 6, 2019

(51) Int. Cl.
| B60L 53/66 | (2019.01) |
| H02J 7/00 | (2006.01) |
| B60L 53/31 | (2019.01) |
| B60L 53/14 | (2019.01) |
| B60L 53/16 | (2019.01) |

(52) U.S. Cl.
CPC .......... *B60L 53/665* (2019.02); *B60L 53/14* (2019.02); *B60L 53/16* (2019.02); *B60L 53/31* (2019.02); *H02J 7/0026* (2013.01)

(58) Field of Classification Search
CPC ...................................................... B60L 53/14
USPC ........................................................ 320/109
See application file for complete search history.

(56) References Cited

U.S. PATENT DOCUMENTS

| 8,466,656 B2 | 6/2013 | Hooker et al. |
| 9,333,864 B2 | 5/2016 | Acena et al. |
| 9,475,393 B2 | 10/2016 | Hooker et al. |
| 9,725,005 B2 | 8/2017 | Geber et al. |
| 2011/0121779 A1* | 5/2011 | Ichikawa ................ B60L 53/14 320/109 |
| 2013/0038283 A1 | 2/2013 | Acena et al. |

(Continued)

FOREIGN PATENT DOCUMENTS

| EP | 2990255 A1 | 3/2016 |
| EP | 3021098 A1 | 5/2016 |

(Continued)

*Primary Examiner* — David V Henze-Gongola
(74) *Attorney, Agent, or Firm* — Ziolkowski Patent Solutions Group, SC; Jean K. Testa

(57) ABSTRACT

A charging station for charging an electrically powered vehicle includes a power source that provides recharging power to one or more energy storage devices on the electrically powered vehicle and a charging device that controls energy transfer from the power source to the electrically powered vehicle. The charging device provides a control pilot signal to a vehicle control circuit of the electrically powered vehicle, with the control pilot signal being received by the vehicle control circuit upon connection of the electrically powered vehicle to the charging station. The charging device measures a voltage level of the control pilot signal upon connection of the electrically powered vehicle to the charging station, performs a selected pre-charge testing routine based on the measured voltage level of the control pilot signal, and enables charging of the electrically powered vehicle from the power source upon compliance with the selected pre-charge testing routine that was performed.

20 Claims, 3 Drawing Sheets

(56) References Cited

U.S. PATENT DOCUMENTS

2015/0097526 A1* 4/2015 Dedona .................... B60L 3/00
320/109

FOREIGN PATENT DOCUMENTS

GB          1425313  A    2/1976
WO       2013030653 A2   3/2013

* cited by examiner

SYSTEM AND METHOD OF PRE-CHARGE TESTING TO PREVENT MISUSE OF ELECTRIC VEHICLE CHARGING STATION

BACKGROUND OF THE INVENTION

Embodiments of the invention relate generally to electric vehicle charging and, more particularly, to a system and method for preventing misuse of an electric vehicle charging station. The charging station performs a pre-charge testing procedure to provide a flexible charging authorization that accommodates differing types of electric vehicles, while meeting desirable safety and efficiency standards.

Electrically powered vehicles, including electric vehicles and plug-in hybrid electric vehicles, provide a zero- or low-emissions solution for transportation in cities and, in the future, are expected to gradually replace the internal combustion engine vehicle as the primary mode of transportation. Electrically powered vehicles include electric motors powered from energy storage devices, such as batteries. As the vehicles operate, the energy storage devices contained therein are depleted. The energy storage devices are commonly recharged by electrical vehicle supply equipment (EVSE) or "charging stations" to enable further use of the vehicle, with such EVSE or charging stations being designed to charge the energy storage device when connected to the vehicle.

It is well understood that charging stations are designed to harmonized standards (i.e., International Electrotechnical Commission (IEC) standards) which incorporate features to prevent the charging stations from being used to supply power for anything other than a conforming electric vehicle. One such feature or test that is employed in charging stations to prevent misuse thereof is a pilot diode test that interacts with and checks a pilot diode D included in a control pilot circuit 2 in an electric vehicle 4, as illustrated in FIG. 1, in order to determine if the vehicle conforms to required standards. Checking for the presence of this diode D is one method that can be used to prevent misuse of the charging station 6, or prevent accidental energization of the charging station should the charging plug get wet (e.g. laying in a puddle of water on the ground).

Another feature or test that is employed in charging stations to prevent misuse thereof—that may be used separate from or in combination with the pilot diode test—is a sequencing test. The sequencing test sets forth a required sequence of events/conditions that must be satisfied in order for charging to commence—with the sequence generally progressing as follows: State A (electric vehicle not connected to charging station)→State B (electric vehicle connected to charging station, but not ready for charging) →State C (electric vehicle connected to charging station and ready for charging). An example of State B is where the charging station requires authorization (e.g., RFID or mobile app authorization) before it will allow charging but has not provided such authorization—such that the charging station will not oscillate the control pilot signal, for example. In State C, the charging station would have been provided authorization to allow charging and would have enabled charging, such as generating an oscillating pilot signal that is provided to control pilot circuit 2 and causing closing of a switch S2 in the control pilot circuit, as shown in FIG. 1.

While many charging stations typically employ both the pilot diode test and the sequencing test prior to enabling charging of an electric vehicle, it is recognized that in some instances the performing of both tests is not necessary to enable charging. That is, IEC standards make provision for smaller electric vehicles that draw less than 16 A to utilize a "simplified control pilot circuit" such as that shown in FIG. 2 that includes a pilot diode but not a switch S2 as in FIG. 1. For such vehicles, performing of the sequencing test is not required such that a "simplified charging" might instead be performed. To account for the possibility of performing such a simplified charging, charging stations were designed that allowed for configuration options to be installed on the EVSE by the equipment owner. While initially such configuration was limited to account for simplified charging, over time the configuration options were expanded to allow for not only the disabling of the sequencing test, but alternatively the disabling of the pilot diode test. That is, charging stations were designed that gave the charging station owner the choice of which of the two tests to use. Thus, in one configuration, the charging station would run the pilot diode test but not run the sequencing test (i.e., simplified charging), and in another configuration the charging station would skip the pilot diode test but enforce/run the sequencing test.

While owner-implemented configuration of a charging station is feasible for environments and situations where the charging station is repeatedly used to charge only a single vehicle (i.e., personal or residential use), it is recognized that such configuration may be problematic and/or inefficient when the charging station is a public charging station. That is, as public charging stations are utilized by many different types of vehicles (i.e., both vehicles that require standard charging and vehicles that only require simplified charging), the charging stations cannot simply be configured a single time and left in that configuration, as certain vehicles would then not comply with the test being employed and would be left unable to use the charging stations to recharge their vehicle—as charging stations configured to supply simplified charging and just run a pilot diode test would not be able to provide higher amperage charging. While a possible workaround to frequent reconfiguring of the charging stations would be to simply disable both the pilot diode test and sequencing test, configuring the charging stations in such a manner is unadvisable, as it could potentially allow for misuse of the charging stations and comprise safety.

Therefore, it is desirable to provide a charging station and method of operation thereof that employs pre-charge testing to prevent misuse of the charging station. It is further desirable that such testing performed by the charging station be performed in an automated fashion, so as to allow for the charging of multiple electric vehicle types while maintain safety and efficiency associated with the charging operation.

BRIEF DESCRIPTION OF THE INVENTION

In accordance with one aspect of the present invention, a charging station for charging an electrically powered vehicle comprising one or more energy storage devices and a vehicle control circuit having a pilot diode is provided. The charging station includes a power source useable to provide recharging power to the one or more energy storage devices on the electrically powered vehicle and a charging device configured to control energy transfer from the power source to the electrically powered vehicle. The charging device is configured to provide a control pilot signal to a vehicle control circuit of the electrically powered vehicle, with the control pilot signal being received by the vehicle control circuit upon connection of the electrically powered vehicle to the charging station. The charging device is also configured to measure a voltage level of the control pilot signal upon connection of the electrically powered vehicle to the charging station, perform a selected pre-charge testing routine based on the measured voltage level of the control pilot signal, and enable charging of the electrically powered vehicle from the power source upon compliance with the selected pre-charge testing routine that was performed.

In accordance with another aspect of the present invention, a method of pre-charge testing for authorizing use of an electric vehicle charging station is performed by a charging device of the electric vehicle charging station. The method includes providing a control pilot signal to a load upon detecting connection thereof to the electric vehicle charging station and determining a state of a load charging cycle based on the control pilot signal, the load charging cycle comprising at least a State A, a State B, and a State C each defined by a different control pilot signal voltage level. The method also includes performing a pilot sequencing test if the charging cycle goes from State A to State B upon connection of the load to the electric vehicle charging station, performing a pilot diode test if the charging cycle goes from State A to State C upon connection of the load to the electric vehicle charging station, and enabling charging of the load from the electric vehicle charging station upon completion of and compliance with the one of the pilot sequencing test or the pilot diode test that was performed.

In accordance with yet another aspect of the present invention, a charging station for charging an electrically powered vehicle is provided. The charging station includes a state drive circuit configured to generate and provide a control pilot signal to a vehicle control circuit of the electrically powered vehicle, a detection circuit configured to measure a voltage level of the control pilot signal responsive to the providing thereof to the vehicle control circuit, and a processor programmed to determine a charging state associated with the electrically powered vehicle based on the measured voltage level of the control pilot signal, perform a first pre-charge testing routine if the voltage level of the control pilot signal is at a first voltage level or a second pre-charge testing routine if the voltage level of the control pilot signal is at a second voltage level, and enable charging of the electrically powered vehicle from the charging station upon completion of and compliance with the one of the first pre-charge testing routine or the second pre-charge testing routine that was performed.

Various other features and advantages will be made apparent from the following detailed description and the drawings.

BRIEF DESCRIPTION OF THE DRAWINGS

The drawings illustrate preferred embodiments presently contemplated for carrying out the invention.

In the drawings.

DETAILED DESCRIPTION

Embodiments of the invention are directed to a system and method for preventing misuse of an electric vehicle charging station. The charging station performs an automatically determined pre-charge testing procedure to provide a flexible charging authorization that accommodates differing types of electric vehicles, while meeting desirable safety and efficiency standards.

In numerous embodiments, the term "electrically powered vehicle" is used to refer to a vehicle that includes one or more electric motors that are used for propulsion. Energy used to propel electrically powered vehicles may come from various energy storage devices, such as, but not limited to, an on-board rechargeable battery, a capacitor, and/or an on-board fuel cell. In one embodiment, the electrically powered vehicle is a hybrid electric vehicle, which may include both an electric motor and a combustion engine. In another embodiment, an electrically powered vehicle is an electric vehicle, which may include only an electric motor for propulsion. Electrically powered vehicles may capture and store energy generated, for example, by braking. Moreover, some electrically powered vehicles are capable of recharging the energy storage device from a power receptacle, such as a power outlet. Accordingly, the term "electrically powered vehicle" as used herein may refer to any vehicle that includes an energy storage device to which electrical energy may be delivered, for example, via a power grid.

Figure 1:
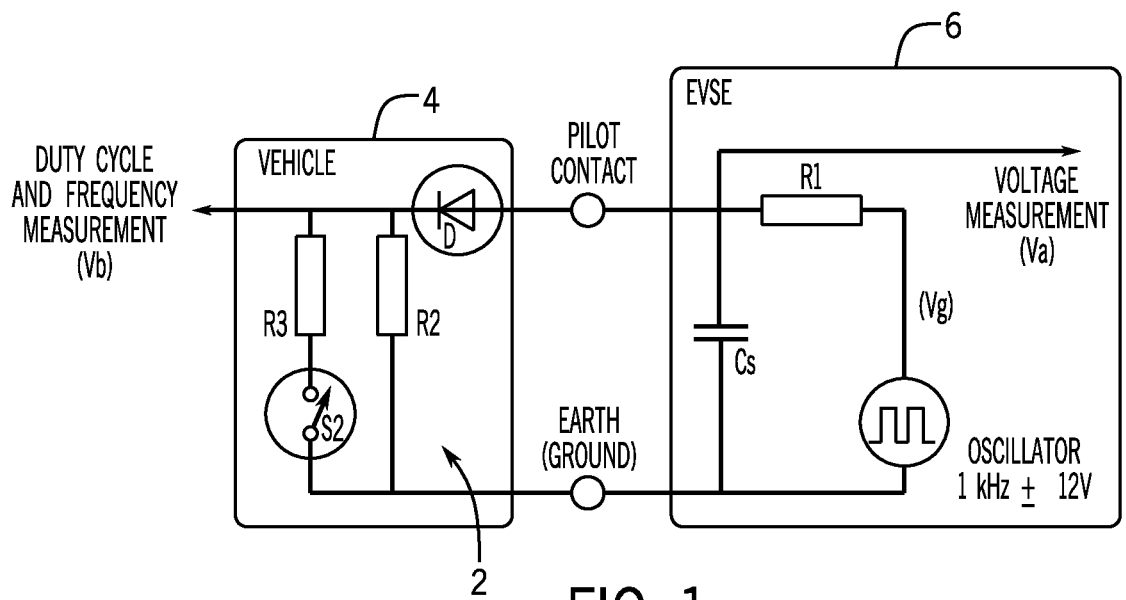
FIG. 1 is a block diagram of a control pilot circuit included in an electric vehicle, as known in the prior art.
Figure 2:
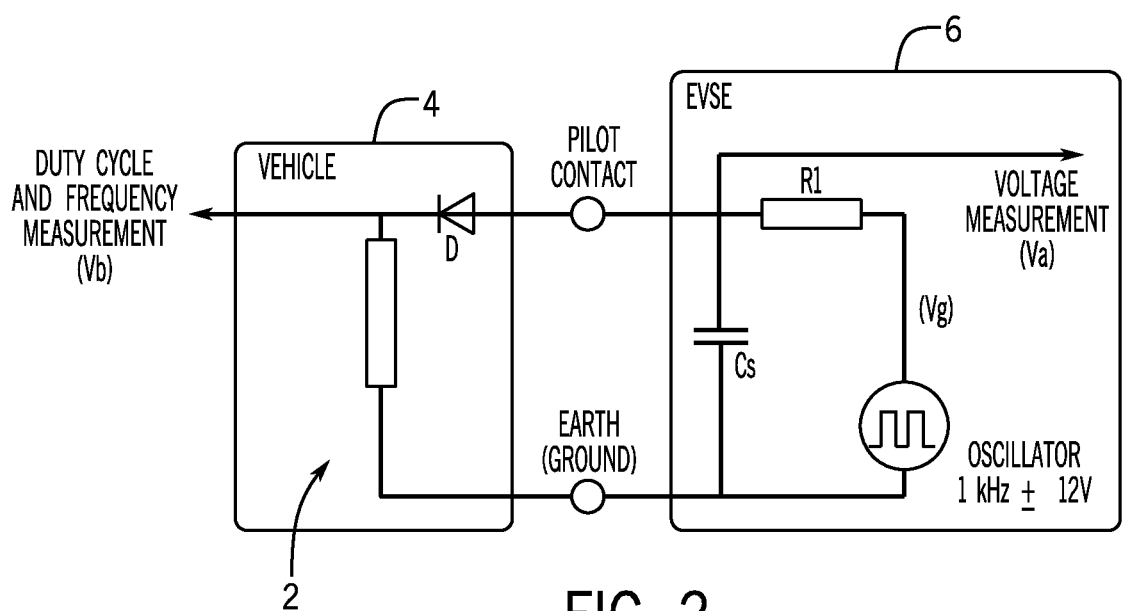
FIG. 2 is a block diagram of a simplified control pilot circuit included in an electric vehicle, as known in the prior art.
Figure 3:
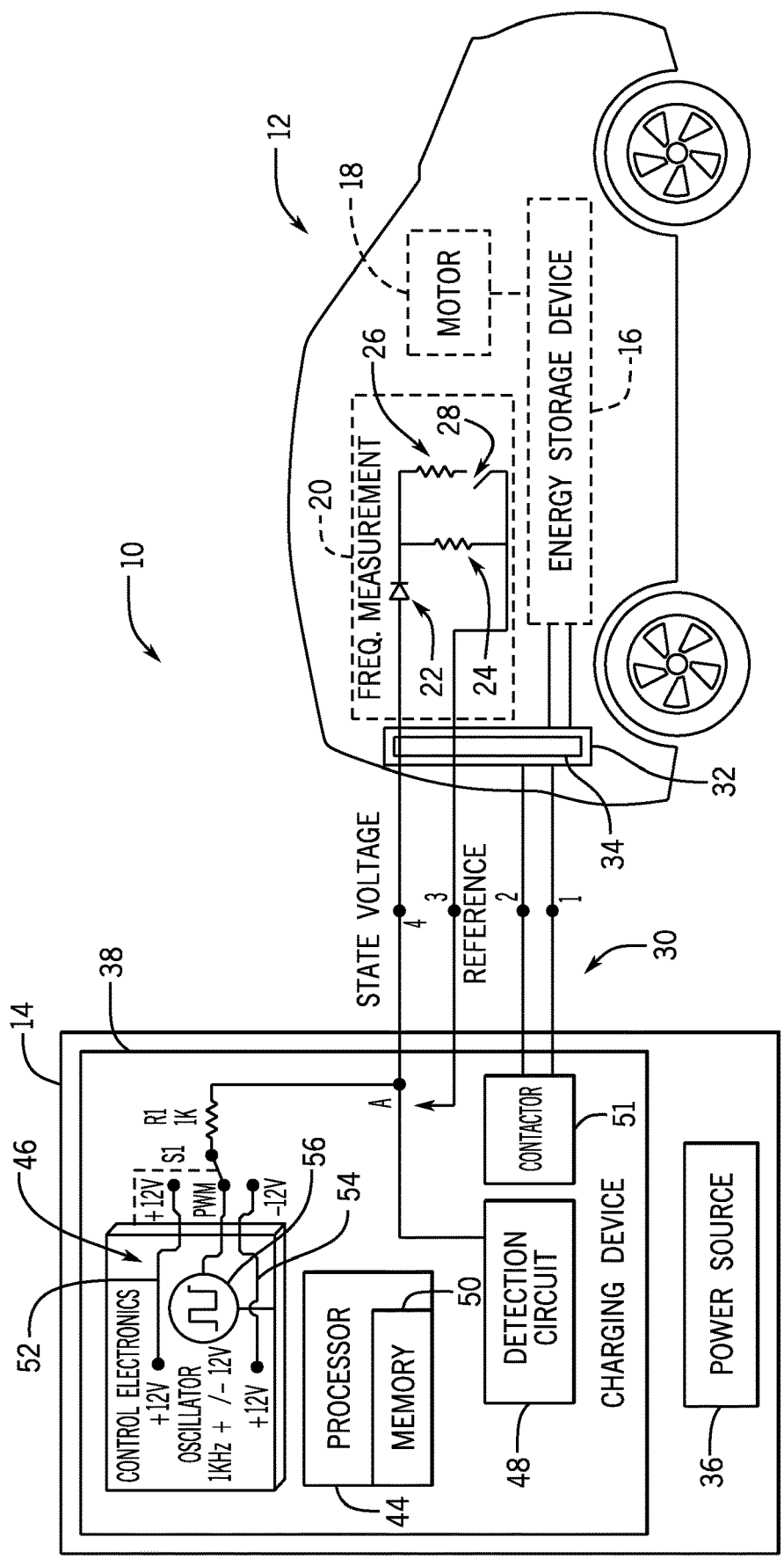
FIG. 3 is a block diagram of an exemplary electric vehicle charging station useable with embodiments of the invention to provide charging to an electric vehicle.

Referring first to FIG. 3, an exemplary system 10 for use in charging an electrically powered vehicle 12 is illustrated. In the exemplary embodiment, system 10 includes a charging station 14 coupled to electrically powered vehicle 12. Electrically powered vehicle 12 includes at least one energy storage device 16 coupled to motor 18. Energy storage device 16 may include, for example, one or more batteries, capacitors, inductors, etc. In the exemplary embodiment, electrically powered vehicle 12 includes a vehicle control circuit 20 coupled to energy storage device 16. Vehicle control circuit 20 communicates with charging station 14 and participates in controlling energy transfer from charging station 14 to energy storage device 16. In the exemplary embodiment, and as described in more detail below, vehicle control circuit 20 includes a pilot diode 22, resistors 24 and 26, and a switching device 28. The pilot diode 22 on electric vehicle 12 is intended to be a common small signal silicon diode, with reverse voltage ratings of at least 100V being recommended since this diode is exposed directly to cable transients. Switching device 28 may be a mechanical switch or relay, or alternatively may be a solid-state switch such as a FET.

Electrically powered vehicle 12 is coupled to charging station 14 through a charging conduit 30 configured to transfer power from charging station 14 to vehicle 12. Charging conduit 30 may couple to vehicle 12 at a charging receptacle 32 via a connector 34 that, according to one embodiment, may be a five-prong (not shown) connector compliant with the SAE J1772 standard, with contacts 1 and 2 being used for the AC power lines, contact 3 being used for the equipment ground, contact 4 being used for the control pilot signal (state voltage and reference signal), and contact 5 being used for proximity detection, for example. According to one embodiment, charging conduit 30 may include at least one conductor for supplying electrical energy to energy storage device 16 and/or to any other component within vehicle 12, and at least one conductor for transmitting information to and/or receiving information from vehicle control circuit 20 and/or any other component within vehicle 12. Additionally, or alternatively, charging conduit 30 may include a cable with one or more conductors for supplying electricity to vehicle 12, without a separate and dedicated conductor for communicating information to/from vehicle 12. In such an embodiment, information may be embedded in one or more power signals transmitted through charging conduit 30 between vehicle charging station 14 and vehicle 12.

In the exemplary embodiment, charging station 14 includes a power source 36 and a charging device 38 coupled to power source 36. As shown, charging device 38 includes a processor 44, a state drive circuit 46 coupled to processor 44, and a detection circuit 48 coupled to each of processor 44 and state drive circuit 46. Processor 44 includes a memory 50 that may be integrated with processor 44 or separate from processor 44 in other charging device embodiment. State drive circuit is configured to provide a control pilot voltage signal to a node A, so as to provide a state voltage to vehicle control circuit 20. In an exemplary embodiment, state drive circuit 46 is configured to supply +/−12V to node A, with state drive circuit 46 including a positive voltage branch 52 to supply +12V to node A and a negative voltage branch 54 to supply −12V to node A. As shown, positive voltage branch 52 and negative voltage branch 54 are substantially balanced, such that the response time of each branch 52 and 54 to a state voltage command from processor 44 is substantially the same.

In an exemplary embodiment, charging device 38 is configured to control energy transfer from power source 36 to electrically powered vehicle 12 (such as via opening/closing of contactors 51) based on a charging state associated with electrically powered vehicle 12—with such charging state being determined/confirmed via performing of what are referred to hereafter as a "pilot sequencing test" and/or a "pilot diode test." Prior to controlling energy transfer, charging device 38 determines the charging cycle state associated with electrically powered vehicle 12 based on the state voltage provided between and affected by each of charging station 14 and electrically powered vehicle 12. More specifically, the state voltage is a voltage affected by charging device 38 and/or vehicle 12 to indicate the changing cycle state associated with electrically powered vehicle 12. In the exemplary embodiment, detection circuit 48 detects the state voltage, and processor 44 determines the charging state associated with electrically powered vehicle 12 based on the detected state voltage.

The different electric vehicle charging cycle states that are typically defined, such as by the SAE J1772, are represented by different voltages of the pilot signal, including: state A (an electric vehicle is not connected) that is represented by 12 volts, state B (an electric vehicle is connected but not ready to accept energy, with sub-states B1 and B2 being possible, as will be described later) that is represented by 9 volts, state C (an electric vehicle is connected, is ready to accept energy, and indoor charging area ventilation is not required) that is represented by 6 volts, state D (an electric vehicle is connected, ready to accept energy, indoor charging area ventilation is required) that is represented by 3 volts, state E (the charging station is disconnected, utility power is not available, or other charging station problem) that is represented by 0 volts, and state F (charging station is not available, or other charging station problem) that is represented by −12 volts. With regard to the above referenced voltages, it is recognized that the stated values are approximate voltages and that, in practice, standards allow for a tolerance of several tenths of a volt (e.g., up to +/−0.7V) from the stated/nominal values, i.e., the voltages may be equal to or substantially equal to the stated 0V/3V/6/9 V/12V values, such that more expensive/precise components are not required.

In operation of charging station 14, processor 44 provides a state voltage command, which may be either high (e.g., 0V) or low (e.g., 5V), to state drive circuit 46. Absent a condition to provide a low state voltage command (e.g., an error, a failure, a test, etc.), processor 44 provides a high state voltage command, resulting in state drive circuit 46 supplying a +12V control pilot voltage signal to node A. According to embodiments of the invention, upon connection of electric vehicle 12 to charging station 14, the processor 44 determines an appropriate pre-charge testing scheme to employ for ensuring that charging may be safely provided, as will be explained in greater detail below—with a more detailed explanation of the pilot sequencing test and pilot diode test that may be performed by processor 44 being described first here below.

In performing a pilot sequencing test, the sequencing test proceeds from a state where the electric vehicle 12 is not connected to charging station 14 (state A) to a state where the vehicle 12 is connected to charging station 14. Upon such connection, diode 22 and resistor 24 are coupled to charging device 38 and, when the state voltage command is high, the state voltage at node A is thus reduced from +12V to +9V. In turn, processor 44 determines that vehicle 12 is coupled to charging station 104, but not ready to accept energy (state B). Once processor 44 determines that vehicle 12 is coupled to charging station 14, processor 44 provides a PWM state voltage command to state drive circuit 46 to initiate energy transfer from charging station 14 to vehicle 12. In the exemplary embodiment, PWM state voltage command causes the state drive circuit (via oscillator 56) to generate a control pilot voltage signal that oscillates at a duty cycle equivalent to a 16 A charging level, with the pilot voltage signal being a +9V, −12V, 1 KHz square wave, for example. The frequency of the oscillating signal is used to verify connection between a compatible electric vehicle 12 and charging station 14, with the vehicle responding to a correct frequency signal by vehicle control circuit 20 closing switch 28 to couple resistor 24 in parallel with resistor 26. The parallel combination of resistors 24 and 26 performs as a voltage divider as described above. The resulting state voltage is either 6V, indicating vehicle 12 is connected and ready to receive energy without ventilation, or 3V, indicating vehicle 12 is connected and ready to receive energy with ventilation. As described above, detection circuit 48 detects the state voltage and processor 44 determines the charging state associated with electrically powered vehicle 12, and if it determines that a 6V/3V signal is present, then contactors 51 may be closed to enable charging (state C).

Rather than performing the sequencing diode test, the processor 44 may determine that only a pilot diode test is needed—without any sequencing requirement. In an occurrence where the state voltage at node A is reduced from +12V to +6V upon connection of vehicle 12 to charging station 14, the processor 44 may determine that only a simplified charging is required (i.e., a jumping from state A to state C, without sequencing requirements). Thus, based on the +6V state voltage at node A, processor 44 performs a self-test to check that an appropriate/compliant electric vehicle 12. Specifically, processor 44 performs a pilot diode test that causes state drive circuit 46 to supply −12V to node A. At the same time, positive voltage branch 52 is turned OFF to stop supplying +12V to node A. As shown in FIG. 3, vehicle control circuit 20 includes diode 22, which blocks the −12V state voltage at node A. Accordingly, resistor 24 is not permitted to behave as a voltage divider with state drive circuit 46 (i.e., a resistor in the state drive circuit). As a result, the −12V state voltage supplied by state drive circuit 46 remains −12V, despite being coupled to vehicle 12. Processor 44, in turn, receives the −12V detect signal and confirms that the −12V test is passed. Conversely, if the −12V detect signal is not received, processor 44 recognizes a fault condition. The pilot diode test performed by charging device thus ensures an appropriate electric vehicle (that includes a pilot diode 22) is connected to charging station 14 and that the pilot diode 22 is functional, thus helping to prevent misuse of the charging station 14, such as attempting to charge a device other than vehicle 12 from charging station 14. In addition to the −12V detect test, the self-test may include one or more other tests, such as, without limitation, a ground fault test.

Thus as set forth above, charging device 38 operates to control energy transfer from power source 36 to electrically powered vehicle 12 based on a charging cycle state associated with electrically powered vehicle 12, with the charging device 38 sourcing a control pilot signal that is used to perform one or more of the following functions: verify that an electric vehicle is present and connected to the charging station 14, permit energization/de-energization of the power supply 36, transmit available supply current to the electric vehicle 12, and monitor the presence of ground.

In operation of a typical charging station, it is recognized that the charging station will often default to employing both a pilot diode test and a pilot sequencing test prior to enabling charging of electric vehicle, but it is recognized that in some instances the performing of both tests is not necessary to enable charging. That is, IEC standards make provision for smaller electric vehicles that draw less than 16 A to utilize a "simplified control pilot circuit"—and for such vehicles, performing of the sequencing test is not required such that a "simplified charging" might instead be performed. While the charging station may be configurable to allow for manual/owner designated disabling of one or both of the sequencing test and pilot diode test, such configuring may be problematic and/or inefficient. First, when the charging station is a public charging station, it is recognized that many different types of vehicles (i.e., both vehicles that require standard charging and vehicles that only require simplified charging) may utilize the charging station such that frequent manual reconfiguring of the charging station would be required or alternatively certain vehicles would not comply with the test/configuration presently being employed and would thus be left unable to use the charging station. Second, if both the sequencing test and pilot diode test were both simply disabled, potential misuse of the charging station 14 would be allowed (i.e., the charging of non-conforming vehicles/devices) and safety might be compromised.

Figure 4:
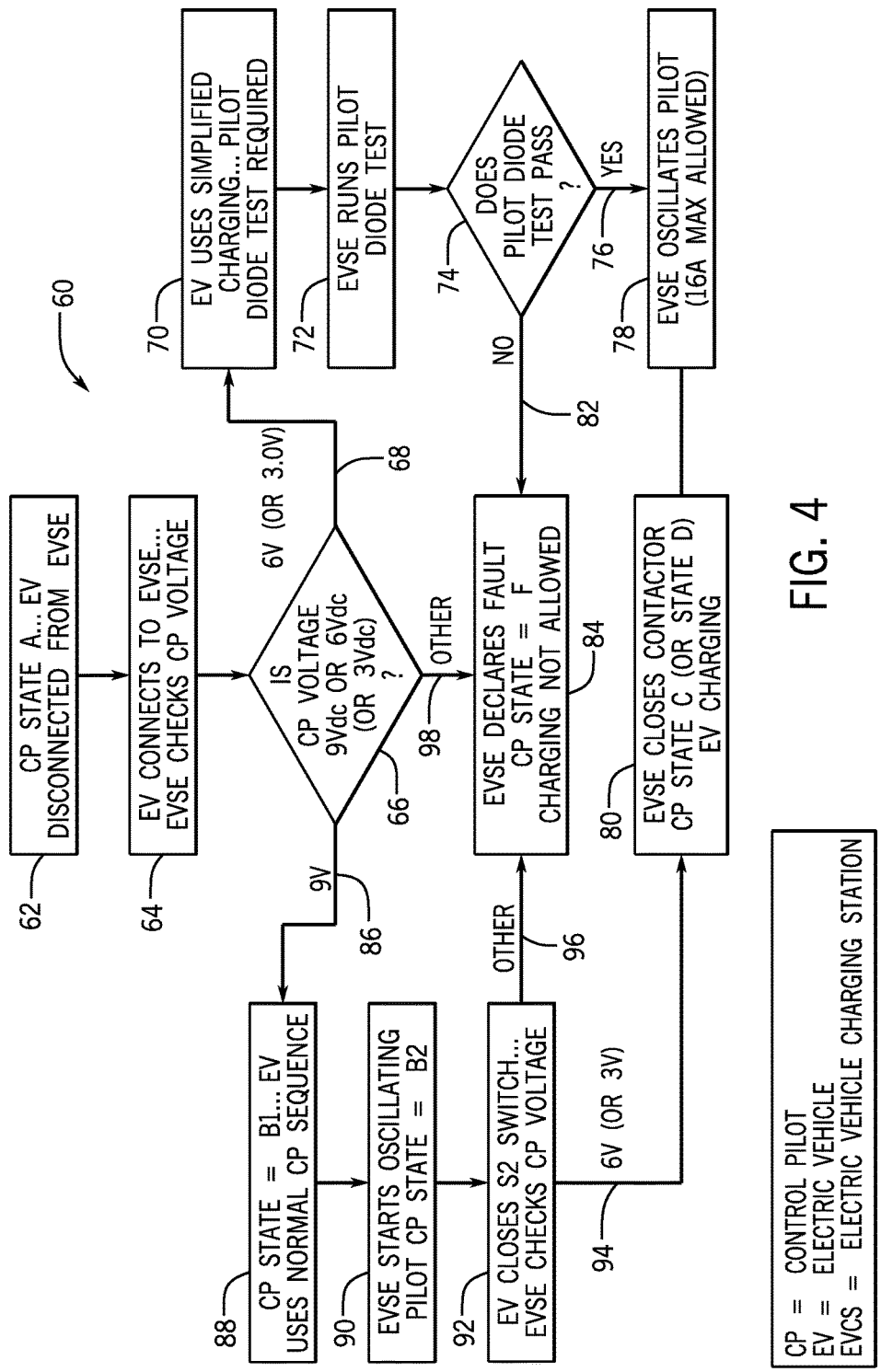
FIG. 4 is a flowchart illustrating an automated pre-charge testing scheme performed by the electric vehicle charging station of FIG. 3 to authorize charging of an electric vehicle and prevent misuse of the electric vehicle charging station, according to an embodiment of the invention.

In light of the above, an exemplary embodiment of the charging station 14 includes an automated testing scheme or technique performed thereby whereby the charging station selectively performs a sequencing test or pilot diode test based on identified requirements and specifications of the electric vehicle that requests charging from the charging station. Referring now to FIG. 4, a technique 60 is illustrated for such an automated testing scheme or technique. While technique 60 is described with reference to charging station 14, it should be appreciated that technique 60 is not limited to charging station 14 and may be used with other charging station embodiments. In describing the technique 60, reference is made back to FIG. 3 to refer to the components of the charging station 14, as it is recognized that the technique 60 would be implemented by charging device 38 of the charging station 14. The processor 44, state drive circuit 46, and detection circuit 48 may perform one or more steps directed to state voltage generation and detection and charging state identification and verification to facilitate implementing of the technique 60.

As shown in FIG. 4, the technique 60 begins at STEP 62 at a State A where the electric vehicle 12 is disconnected from the charging station 14. During this time, processor 44 is providing a high state voltage command (i.e., "control pilot signal") to state drive circuit 46, resulting in state drive circuit 46 supplying +/−12V to node A. As long as a +12V control pilot signal is received back by detection circuit 48 (i.e., +12V detect signal), processor 44 determines that no electric vehicle or other load is connected to charging station 14. At STEP 64, an electric vehicle 12 is connected to the charging station 14, during which time the charging station 14 continues to supply a control pilot voltage signal to the electric vehicle 12 via state voltage circuit 46. It is recognized that charging station 14 is able to determine that the connector 34 is fully inserted into the vehicle receptacle 32 and properly connected to the electric vehicle 12 by sensing resistance of resistor 24, as resistor 24 will cause a drop in the detect signal voltage that is sensed by detection circuit 48. Thus, upon a drop in the voltage of the control pilot detect signal, a determination is then made at STEP 66 of the specific state voltage present at node A resulting from the connection of electric vehicle 12. Specifically, it is determined whether the resulting state voltage at node A is either 6V or 9V, with it being recognized that the voltage present at node A is determined in part based on the configuration of the electric vehicle 12 and the vehicle control circuit 20 included therein. That is, for a smaller electric vehicle that draw less than 16 A, it is recognized that switch 28 may be excluded from vehicle control circuit 20 (i.e., a simplified control pilot circuit), as compared to an electric vehicle 12 that draws more than 16 A and includes switch 28 as part of vehicle control circuit 20. Accordingly, the control pilot voltage at node A that is measured/determined at STEP 66 will vary based on the type of electric vehicle 12 connected to the charging station 14—with a 9V being present at node A for a larger electric vehicle drawing more than 16 A (due to switch 28 therein being open at this stage) and 6V (or 3V for state D charging) being present at node A for a smaller electric vehicle drawing less than 16 A (due to there being no switch 28 therein—equivalent to a closed switch) This variance in the voltage at node A is based on whether resistors 24 and 26 in vehicle control circuit 20 are connected in parallel to act as a voltage divider—with the presence of an open switch 28 or no switch dictating whether such a parallel connection is present.

If it is determined at STEP 66 that a 6V (or 3V) state voltage is present at node A, as indicated at 68, then technique 60 continues at STEP 70 by identifying that a smaller electric vehicle drawing less than 16 A is connected to charging station 14—such that a simplified charging may be performed to charge electric vehicle 12. That is, in a simplified charging, a stage A-->stage C jump would be performed rather than a typical stage A-->stage B-->stage C sequencing. Based on the determination that a simplified charging technique may be employed to charge electric vehicle 12, it is recognized that a pilot sequencing test is not required, and thus the technique 60 continues at STEP 72 by performing only a pilot diode test. As set forth previously, processor 44 performs a pilot diode test by causing state drive circuit 46 to supply −12V to node A via negative voltage branch 54 (with positive voltage branch 52 being turned OFF to stop supplying +12V to node A while the −12V is being supplied). Assuming that diode 22 in vehicle control circuit 20 is functioning properly, diode 22 acts to block the −12V state voltage at node A and resistor 24 is not permitted to behave as a voltage divider with state drive circuit (i.e., a resistor in the state drive circuit). Accordingly, the −12V state voltage supplied by state drive circuit 46 remains −12V, despite being coupled to vehicle 12.

Thus, upon a running of the pilot diode test at STEP 72, a determination is made at STEP 74 as to whether the electric vehicle has passed the pilot diode test. If diode 22 acts to block the −12V state voltage at node A, then processor 44, in turn, receives the −12V detect signal and confirms that the −12V pilot diode test is passed, as indicated at 76. The technique 60 thus proceeds to STEP 78 where the state drive circuit 46 functions to oscillate the control pilot signal as an indication that the charging station 14 is ready to provide charging to the electric vehicle 12. That is, processor 44 causes state drive circuit 46 (i.e., oscillator 56 thereof) to provide a PWM state voltage command to initiate energy transfer from charging station 14 to vehicle 12. In the exemplary embodiment, PWM state voltage command oscillates at a duty cycle equivalent to a 16 A charging level, such as at 1 kHz. At STEP 80, the charging station 14 then closes contactors 51 in charging device 38 such that charging power may be provided from charging station 14 to electric vehicle 12—with a state C thus being entered into. In practice, the charging station 14 is thus able to progress from state A directly to state C while only performing the pilot diode test and performing the simplified charging of the electric vehicle at less than 16 A.

If, at STEP 74, the −12V detect signal is not blocked by a functioning diode 22 at node A, then the −12V detect signal would not be received by processor 44, and processor 44 determines that the pilot diode test has not passed, as indicated at 82. A fault condition will thus be identified at STEP 84, and charging of the electric vehicle via charging station 14 is disabled—with a state F thus being entered into.

Referring still to FIG. 4, and returning now back to STEP 66, if it is determined at STEP 66 that a 9V state voltage is present at node A, as indicated at 86, then technique 60 continues at STEP 88 by identifying that a larger electric vehicle drawing more than 16 A is connected to charging station 14—such that a normal charging sequencing (i.e., not a simplified charging) is required to charge electric vehicle 12. Based on the determination that a normal charging technique should be employed to charge electric vehicle 12, it is recognized that a typical stage A-->stage B-->stage C sequencing should be followed and that a sequencing test is required, and thus the technique 60 continues at STEP 88 by determining that state drive circuit 46 should provide a control pilot signal accordingly—with it being recognized at STEP 88 that the charging electric vehicle 12 is presently in state B (not ready to accept charge)—i.e., a stage B1. At STEP 90, as part of the sequencing test, processor 44 causes state drive circuit 46 (i.e., oscillator 56 thereof) to oscillate the control pilot signal and provide a PWM state voltage command to initiate energy transfer from charging station 14 to vehicle 12—such that the charging electric vehicle 12 progresses to a stage B2. In the exemplary embodiment, PWM state voltage command oscillates at 1 kHz.

When energy transfer is initiated upon oscillation of the control pilot signal, vehicle controller 20 closes switch 28 at STEP 92. Closing of switch 28 couples resistor 24 in parallel with resistor 26 so as to indicate that the electric vehicle is ready to accept energy from the charging station. That is, upon closing of switch 28, the parallel combination of resistors 24 and 26 performs as a voltage divider as described above, such that the state voltage drops to either 6V, indicating vehicle 12 is connected and ready to receive energy without ventilation, or 3V, indicating vehicle 12 is connected and ready to receive energy with ventilation. At STEP 92, the processor 44 checks the control pilot voltage to verify that it is at one of the expected 6V or 3V levels—indicating that the electric vehicle 12 is ready and able to except charging power from the charging station 14.

If the check at STEP 92 indicates that the control pilot voltage to verify that it is at one of the expected 6V or 3V levels, as indicated at 94, then technique continues to STEP 80 where the charging station 14 then closes contactors 51 in charging device 38 such that charging power may be provided from charging station 14 to electric vehicle 12—with a state C thus being entered into. Conversely, if the check at STEP 92 indicates that the control pilot voltage is not at one of the expected 6V or 3V levels, as indicated at 96, then technique continues to STEP 84, where processor 44 determines that a fault condition is present in the charging station 14 and/or electric vehicle. A fault condition is thus declared at STEP 98 and charging of the electric vehicle 12 via charging station 14 is disabled—with a state F thus being entered into.

Referring still to FIG. 4, and returning again back to STEP 66, if it is determined at STEP 66 that neither a 6V state voltage or 9V state voltage is present at node A, as indicated at 98, then technique 60 continues directly to STEP 84 where processor 44 determines that a fault condition is present in the charging station 14 and/or electric vehicle. A fault condition is thus declared at STEP 84 and charging of the electric vehicle 12 via charging station 14 is disabled—with a state F thus being entered into.

Beneficially, embodiments of the invention thus provide an electric vehicle charging station and method of operation thereof that prevents misuse of the electric vehicle charging station in providing charging power to an electric vehicle. The automated pre-charge testing procedure performed by the charging station provides a flexible charging authorization that accommodates differing types of electric vehicles, as well providing for either AC or DC charging, while meeting desirable safety and efficiency standards. The charging station performs an automated check of the electric vehicle requesting charging and determines an appropriate pre-charge testing procedure for authorizing/enabling charging of the electric vehicle based on this check.

A technical effect of the methods, systems, and apparatus described herein is that a computer implemented technique is provided that includes: identifying parameters of an electric vehicle connected to a charging station and requesting charging therefrom, automatically determining an appropriate pre-charge testing procedure for authorizing/enabling charging of the electric vehicle based on the identified parameters, and ensuring compliance with the selected pre-charge test procedure to confirm that charging of the electric vehicle may proceed.

Therefore, according to an embodiment of the invention, a charging station for charging an electrically powered vehicle comprising one or more energy storage devices and a vehicle control circuit having a pilot diode is provided. The charging station includes a power source useable to provide recharging power to the one or more energy storage devices on the electrically powered vehicle and a charging device configured to control energy transfer from the power source to the electrically powered vehicle. The charging device is configured to provide a control pilot signal to a vehicle control circuit of the electrically powered vehicle, with the control pilot signal being received by the vehicle control circuit upon connection of the electrically powered vehicle to the charging station. The charging device is also configured to measure a voltage level of the control pilot signal upon connection of the electrically powered vehicle to the charging station, perform a selected pre-charge testing routine based on the measured voltage level of the control pilot signal, and enable charging of the electrically powered vehicle from the power source upon compliance with the selected pre-charge testing routine that was performed.

According to another embodiment of the invention, a method of pre-charge testing for authorizing use of an electric vehicle charging station is performed by a charging device of the electric vehicle charging station. The method includes providing a control pilot signal to a load upon detecting connection thereof to the electric vehicle charging station and determining a state of a load charging cycle based on the control pilot signal, the load charging cycle comprising at least a State A, a State B, and a State C each defined by a different control pilot signal voltage level. The method also includes performing a pilot sequencing test if the charging cycle goes from State A to State B upon connection of the load to the electric vehicle charging station, performing a pilot diode test if the charging cycle goes from State A to State C upon connection of the load to the electric vehicle charging station, and enabling charging of the load from the electric vehicle charging station upon completion of and compliance with the one of the pilot sequencing test or the pilot diode test that was performed.

According to yet another embodiment of the invention, a charging station for charging an electrically powered vehicle is provided. The charging station includes a state drive circuit configured to generate and provide a control pilot signal to a vehicle control circuit of the electrically powered vehicle, a detection circuit configured to measure a voltage level of the control pilot signal responsive to the providing thereof to the vehicle control circuit, and a processor programmed to determine a charging state associated with the electrically powered vehicle based on the measured voltage level of the control pilot signal, perform a first pre-charge testing routine if the voltage level of the control pilot signal is at a first voltage level or a second pre-charge testing routine if the voltage level of the control pilot signal is at a second voltage level, and enable charging of the electrically powered vehicle from the charging station upon completion of and compliance with the one of the first pre-charge testing routine or the second pre-charge testing routine that was performed.

This written description uses examples to disclose the invention, including the best mode, and also to enable any person skilled in the art to practice the invention, including making and using any devices or systems and performing any incorporated methods. The patentable scope of the invention is defined by the claims, and may include other examples that occur to those skilled in the art. Such other examples are intended to be within the scope of the claims if they have structural elements that do not differ from the literal language of the claims, or if they include equivalent structural elements with insubstantial differences from the literal languages of the claims.

What is claimed is:

1. A charging station for charging an electrically powered vehicle comprising one or more energy storage devices and a vehicle control circuit having a pilot diode, the charging station comprising:
   a power source useable to provide recharging power to the one or more energy storage devices on the electrically powered vehicle; and
   a charging device configured to control energy transfer from the power source to the electrically powered vehicle, the charging device configured to:
      provide a control pilot signal to a vehicle control circuit of the electrically powered vehicle, with the control pilot signal being received by the vehicle control circuit upon connection of the electrically powered vehicle to the charging station;
      measure a voltage level of the control pilot signal upon connection of the electrically powered vehicle to the charging station;
      perform one of a first pre-charge testing routine and a second pre-charge testing routine, with the one of the first pre-charge testing routine and the second pre-charge testing routine being selected based on the measured voltage level of the control pilot signal; and
      enable charging of the electrically powered vehicle from the power source upon compliance with the one of the first pre-charge testing routine and the second pre-charge testing routine that was performed.

2. The charging station of claim 1 wherein the charging device is further configured to:
   determine a charging state associated with the electrically powered vehicle based on the measured voltage level of the control pilot signal;
   perform the first pre-charge testing routine if the voltage level of the control pilot signal is at a first voltage level or the second pre-charge testing routine if the voltage level of the control pilot signal is at a second voltage level; and
   enable charging of the electrically powered vehicle from the power source upon completion of and compliance with the one of the first pre-charge testing routine or the second pre-charge testing routine that was performed.

3. The charging station of claim 2 wherein the first voltage level is approximately 9V, with the approximately 9V voltage level of the control pilot signal indicating that a switch is present in the vehicle control circuit and is open.

4. The charging station of claim 3 wherein the first pre-charge testing routine comprises a pilot sequencing test following a state A-->state B-->state C sequence, with the voltage level of the control pilot signal varying between each state.

5. The charging station of claim 4 wherein, in performing the pilot sequencing test, the charging device is configured to:
   oscillate the control pilot signal provided to the vehicle control circuit, with the oscillating control pilot signal causing the switch in the vehicle control circuit to close;
   measure the voltage level of the control pilot signal upon closing of the switch in the vehicle control circuit;
   cause contactors in the charging device to close if the voltage level of the control pilot signal is at a third level, so as to enable charging of the electrically powered vehicle from the power source;
   otherwise declare a fault condition and disable charging of the electrically powered vehicle from the power source.

6. The charging station of claim 5 wherein the third voltage level is either approximately 3V or approximately 6V.

7. The charging station of claim 2 wherein the second voltage level is approximately 3V or approximately 6V, with the approximately 3V or 6V voltage level of the control pilot signal indicating that the vehicle control circuit comprises a simplified vehicle control circuit that lacks a switch therein.

8. The charging station of claim 7 wherein the second pre-charge testing routine comprises a pilot diode test following a state A-->state C sequence, with the voltage level of the control pilot signal varying between each state.

9. The charging station of claim 8 wherein, in performing the pilot diode test, the charging device is configured to:
provide a control pilot signal to the vehicle control circuit having a voltage of −12V;
measure the voltage level of the control pilot signal responsive to the providing thereof to the vehicle control circuit;
oscillate the control pilot signal provided to the vehicle control circuit and cause contactors in the charging device to close if the voltage level of the control pilot signal remains at approximately −12V;
otherwise declare a fault condition and disable charging of the electrically powered vehicle from the power source.

10. The charging station of claim 9 wherein the charging device is configured to oscillate the control pilot signal at a duty cycle equivalent to a 16A charging level.

11. The charging station of claim 2 wherein the charging device is configured to declare a fault condition and disable charging of the electrically powered vehicle from the power source if the voltage level of the control pilot signal is not at either of the first voltage level or the second voltage level upon connection of the electrically powered vehicle to the charging station.

12. The charging station of claim 1 wherein the charging device comprises:
a state drive circuit configured to generate the control pilot signal;
a detection circuit configured to measure the voltage level of the control pilot signal responsive to the providing thereof to the vehicle control circuit; and
a processor programmed to provide commands to the state drive circuit to control generation of the control pilot signal and enable and disable charging of the electrically powered vehicle from the power source.

13. A method of pre-charge testing for authorizing use of an electric vehicle charging station, the method performed by a charging device of the electric vehicle charging station and comprising:
providing a control pilot signal to a load upon detecting connection thereof to the electric vehicle charging station;
determining a state of a load charging cycle based on the control pilot signal, the load charging cycle comprising at least a State A, a State B, and a State C each defined by a different control pilot signal voltage level;
performing a pilot sequencing test if the charging cycle goes from State A to State B upon connection of the load to the electric vehicle charging station, otherwise performing a pilot diode test if the charging cycle goes from State A to State C, bypassing state B, upon connection of the load to the electric vehicle charging station; and
enabling charging of the load from the electric vehicle charging station upon completion of and compliance with the one of the pilot sequencing test or the pilot diode test that was performed.

14. The method of claim 13 wherein the charging cycle is at State B when the control pilot signal voltage level is at approximately 9V, the 9V control pilot signal voltage level indicating that the load comprises a vehicle control circuit including a switch in an open state and providing for charging of the load at a 16A or greater charging level.

15. The method of claim 14 wherein performing the pilot sequencing test comprises:
oscillating the control pilot signal provided to the vehicle control circuit, with the oscillating control pilot signal causing the switch to close;
measuring the control pilot signal voltage level upon closing of the vehicle control circuit switch;
causing contactors in the electric vehicle charging station to close if the measured control pilot signal voltage level is at approximately 6V upon closing of the vehicle control circuit switch, so as to enable charging of the load;
otherwise declaring a fault condition and disabling charging of the load via the electric vehicle charging station.

16. The method of claim 13 wherein the charging cycle is at State C when the control pilot signal voltage level is at approximately 6V.

17. The method of claim 16 wherein the 6V control pilot signal voltage level indicates that the load comprises a simplified vehicle control circuit with no switch therein when the load charging cycle jumps from state A to state C and provides for charging of the load at a 16A or greater charging level; and
wherein the 6V control pilot signal voltage level indicates that the load comprises a vehicle control circuit including a switch in a closed state when the load charging cycle goes from state B to state C and provides for charging of the load at a 16A or greater charging level.

18. The method of claim 16 wherein performing the pilot diode test comprises:
providing a control pilot signal having a voltage of −12V to the load;
measuring the control pilot signal voltage level responsive to the providing of the −12V control pilot signal;
oscillating the control pilot signal and causing contactors in the electric vehicle charging station to close if the control pilot signal voltage level remains at approximately −12V;
otherwise declaring a fault condition and disabling charging of the load via the electric vehicle charging station.

19. The method of claim 18 wherein the control pilot signal is oscillated at a duty cycle equivalent to a 16A charging level as part of the pilot diode test when the charging cycle jumps from State A to State C.

20. A charging station for charging an electrically powered vehicle, the charging station comprising:
a state drive circuit configured to generate and provide a control pilot signal to a vehicle control circuit of the electrically powered vehicle upon detecting connection thereof to the charging station;
a detection circuit configured to measure a voltage level of the control pilot signal responsive to the providing thereof to the vehicle control circuit; and
a processor that, upon connection of the electrically powered vehicle to the charging station, is programmed to:
determine a charging state associated with the electrically powered vehicle based on the measured voltage level of the control pilot signal;
perform a first pre-charge testing routine if the voltage level of the control pilot signal is at a first voltage level, or alternately perform a second pre-charge testing routine if the voltage level of the control pilot signal is at a second voltage level; and enable charging of the electrically powered vehicle from the charging station upon completion of and compliance with the one of the first pre-charge testing routine or the second pre-charge testing routine that was performed.

* * * * *